(12) United States Patent
Berg

(10) Patent No.: US 6,578,878 B2
(45) Date of Patent: Jun. 17, 2003

(54) LINE CONNECTOR, IN PARTICULAR FOR FUEL LINES

(75) Inventor: Manfred Berg, Wipperfurth (DE)

(73) Assignee: Voss Automotive GmbH, Wipperfurth (DE)

( * ) Notice: Subject to any disclaimer, the term of this patent is extended or adjusted under 35 U.S.C. 154(b) by 0 days.

(21) Appl. No.: 09/739,480

(22) Filed: Dec. 18, 2000

(65) Prior Publication Data

US 2001/0026068 A1 Oct. 4, 2001

(30) Foreign Application Priority Data

Dec. 17, 1999 (DE) .................... 299 22 230 U

(51) Int. Cl.$^7$ .................... F16L 21/00; F16L 27/10; F16L 57/02
(52) U.S. Cl. .................... 285/226; 285/235; 285/305
(58) Field of Search .................... 285/223, 226, 285/235, 237, 305

(56) References Cited

U.S. PATENT DOCUMENTS

| | | | | |
|---|---|---|---|---|
| 2,711,331 A | * | 6/1955 | Temple .................... | 285/305 |
| 3,727,953 A | * | 4/1973 | Martin et al. .................... | 285/305 |
| 5,090,747 A | * | 2/1992 | Kotake .................... | 285/305 |
| 5,720,656 A | * | 2/1998 | Savage .................... | 285/226 |
| 5,732,724 A | * | 3/1998 | Becknell .................... | 134/107 |
| 6,065,780 A | * | 5/2000 | Hiroshima .................... | 285/226 |

* cited by examiner

Primary Examiner—Lynne H. Browne
Assistant Examiner—Aaron Dunwoody
(74) Attorney, Agent, or Firm—Kilpatrick Stockton LLP

(57) ABSTRACT

The invention relates to a line connector (1) for pipelines and/or hose lines, in particular fuel lines, comprising a connecting body (2) together with at least one line-connecting element (4). The or each line-connecting element (4) is connected to the connecting body (2) via a transitional section (16) which can be deformed elastically and/or plastically in such a manner that it can be bent or buckled transversely to a push-on axis (12) of the line and relative to the connecting body (2) while keeping the media sealed in. The line-connecting element (4) together with the transitional section (16) and the connecting body (2) is formed by a single-piece moulding (18) produced monolithically in a plastic moulding procedure in a multicomponent injection-moulding process from at least two different materials.

8 Claims, 2 Drawing Sheets

LINE CONNECTOR, IN PARTICULAR FOR FUEL LINES

FIELD OF THE INVENTION

The present invention relates to a line connector for pipelines and/or hose lines, in particular fuel lines, comprising a connecting body together with at least one line-connecting element.

BACKGROUND OF THE INVENTION

Nowadays, known line connectors of the type mentioned consist predominantly of plastic. The line-connecting element is generally designed as a pointed profile (drive-in point) for the force- and/or form-fitting pushing-on of a line. In this arrangement, the connecting body can be designed as a coupling housing of a plug-in or socket part of a plug-in coupling. Line connectors of this type are used, for example, in motor vehicles in the region of the fuel lines. In this case, accident-induced (crash-induced) deformations of the vehicle are problematical, since the line connector may collide with engine and/or bodywork parts. In severe cases, this may result in the connector breaking, and the resultant unsealed state leads to a leakage of fuel which, when in contact with hot engine parts, could be ignited and therefore cause a vehicle fire.

FR-A-2 257 841 describes, for connecting two pipes, a plastic collar which is pressed onto the particular pipe on both sides using a respective union screw nut. This collar acts merely as a type of expansion joint.

FR-A-1 519 744 also describes a very similar arrangement, two pipes being connected via a rubber collar.

U.S. Pat. No. 4,810,008 describes a connector (fitting) for pipes in sprinkler systems, the said connector being intended to make simple exchange of leaking parts, for example pipe sections, possible. For this purpose, the connector has pipe connections which, via expansion-bellows-like intermediate sections, can be moved longitudinally in such a manner that they can be pushed axially onto the line and bonded in place.

GB-A-2 120 341 discloses a deformable pipe connector having an expansion- or concertinaed-bellows-like section which is formed by a metallic corrugated pipe and can be bent plastically about any desired angle.

BRIEF SUMMARY OF THE INVENTION

The present invention is based on the object of improving a line connector of the type described at the beginning in such a manner that there is a noticeable reduction in the risk of damage, in particular of breakage, due to an externally applied force, especially a crash-induced force. At the same time, it should nevertheless be possible to produce the connector simply and cost-effectively.

According to the invention this is achieved in that the (or each) line-connecting element is connected to the connecting body via a transitional section which can be deformed elastically and/or plastically in such a manner that it can be bent or buckled transversely to a push-on axis of the line and relative to the connecting body while keeping the media sealed in, the line-connecting element together with the transitional section and the connecting body being formed from a single-piece moulding produced monolithically in a plastic moulding procedure in a multicomponent injection-moulding process from at least two different materials.

This advantageous refinement means that a risk of breakage in the region of the line connector is noticeably reduced because the properties of the connecting section mean that the media is kept sealed in even when the section buckles by up to at least 90°.

Although such severe buckling results in a plastic deformation impairing the flow cross section, with the result that the connector would have to be replaced, leakages are effectively avoided even in the case of such severe deformations. More minor deformations are possible even in the elastic range enabling the connector to continue to remain useable. In order to obtain the deformability which, according to the invention, is break-proof, the connecting section is configured, in particular empirically, with regard to its material-specific and/or shaping-induced properties, in such a manner that a predetermined deformation without leakage is possible. For this purpose, it has turned out to be particularly advantageous to use a thermoplastic without fibre reinforcement, in particular PA 12, for the connecting section, while the remaining sections consist of a thermoplastic, in particular the same thermoplastic, but with fibre reinforcement, in particular with a portion of glass fibre, preferably of PA 12-23% glass fibre. In addition, these materials are preferably electrically conductive receptors in order, in view of the preferred use in the fuel sphere, to avoid static charging and the formation of sparks possibly resulting therefrom. The design as a single-piece moulding which is injection-moulded monolithically advantageously means that the production is nevertheless simple and cost-effective.

BRIEF DESCRIPTION OF THE DRAWINGS

The invention will be explained more precisely with reference to preferred exemplary embodiments illustrated in the drawing, in which.

DETAILED DESCRIPTION OF PREFERRED EMBODIMENT

Figure 1:
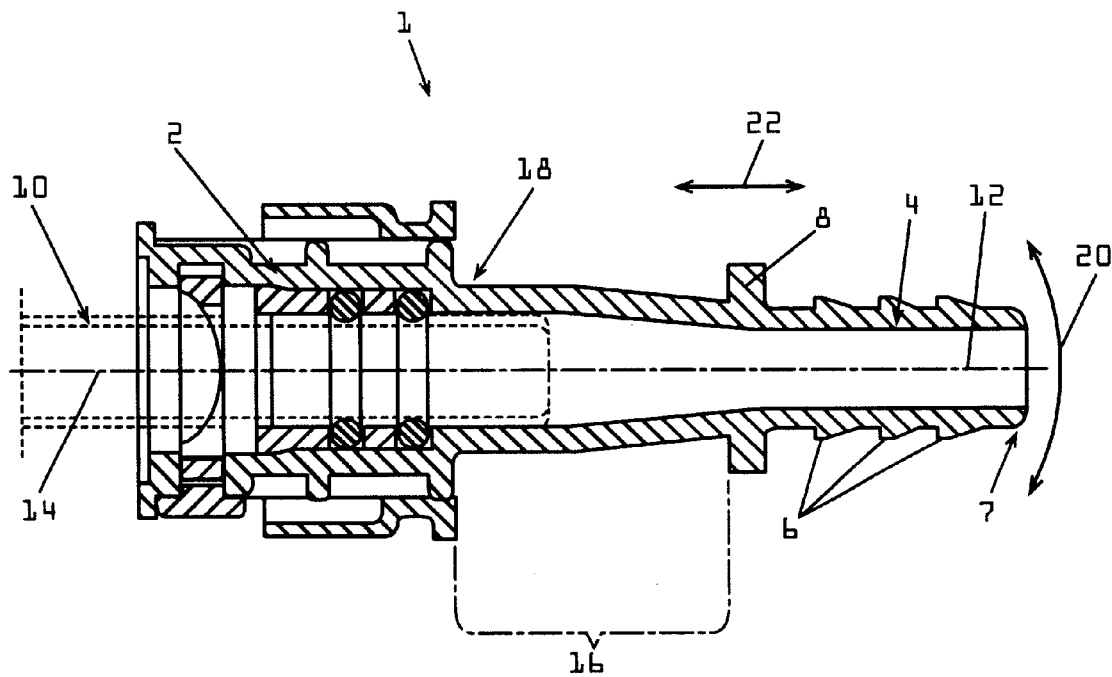
FIG. 1 shows a longitudinal section through a first embodiment of a line connector according to the invention.

A line connector 1 according to the invention is used for the connection of at least one (not illustrated) pipeline or hose line, in particular a fuel line. For this purpose, the line connector 1 comprises a connecting body 2 together with at least one line-connecting element 4.

The line-connecting element 4 is preferably designed as a customary pointed profile (drive-in point) for the pushing-on of a line. As is customary per se, the pointed profile has a plurality of retaining ribs 6 which are distributed along its length, run continuously in an annular manner in the circumferential direction and have a barb-like contour. This results in an at least force-fitting, in particular, however, force- and form-fitting securing of the pushed-on line. In order to limit the pushing-on of the line, in particular, however, also as an abutment element for holding the line-connecting element 4 in place as the line is being pushed or pressed on, the line-connecting element 4 can have a radially extending annular web 8 on its side facing the connecting body 2 and opposite a free plug-in end 7.

The connecting body 2 is preferably designed as a coupling housing of a plug-in coupling. In the exemplary embodiment illustrated, the coupling housing forms a socket part having a receiving opening for the plugging-in of a plug-in part 10 (only indicated by dashed lines).

In the examples illustrated, the line-connecting element 4 and the connecting body 2 are arranged lying one behind the other with the line-connecting element 4 being arranged coaxially, i.e. aligned in the axial direction, with respect to a push-on axis 12 of the line, on the one hand, and, on the other hand, the connecting body 2 being arranged coaxially, i.e. aligned in the axial direction, with respect to a plug-in axis 14 of the plug-in coupling. However, a different, virtually random angular arrangement between the connecting body 2 and the line-connecting element 4 is also entirely possible.

According to the invention, the line-connecting element 4 can be moved relative to the connecting body 2 with elastic and/or plastic deformation in some regions, specifically it can be bent or even buckled transversely to the push-on axis 12 without the line connection becoming leaky as a result. For this purpose, the line-connecting element 4 is connected to the connecting body 2 preferably via an inherently deformable transitional section 16. In a preferred refinement, the line-connecting element 4 together with the transitional section 16 and the connecting body 2 is formed by a single-piece moulding 18 produced monolithically from plastic in a moulding procedure. In this case, it is possible for the transitional section 16 to obtain its deformability according to the invention by virtue of material-specific and/or shaping-induced properties, enabling buckling by up to at least 90° while keeping the media sealed in.

Figure 2:
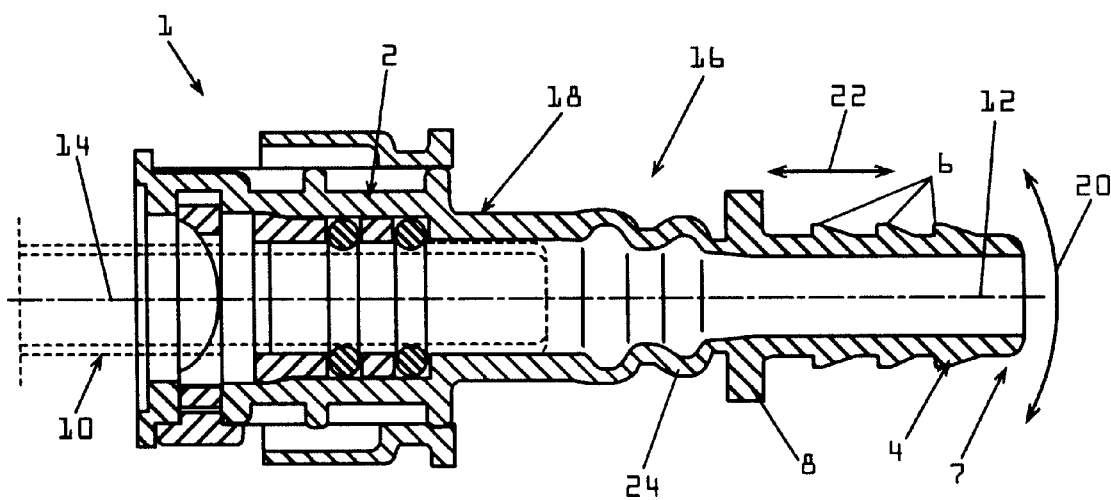
FIG. 2 shows a view analogous to FIG. 1 of a second embodiment of the line connector.
Figure 3:
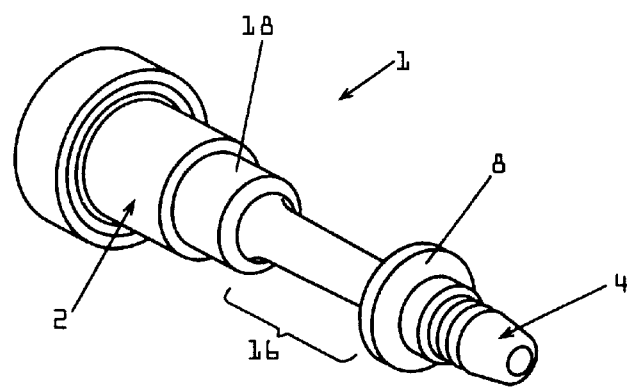
FIG. 3 shows a perspective view of a third, preferred design of the line connector.
Figure 4:
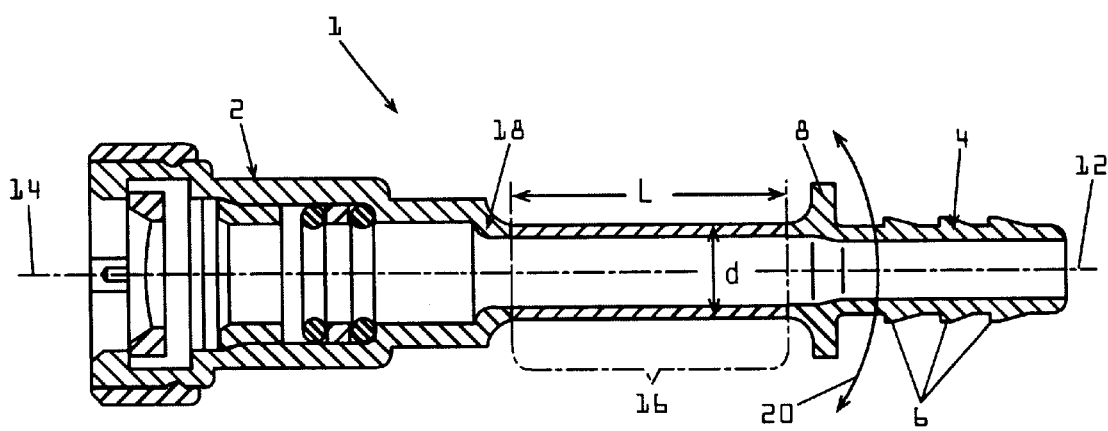
FIG. 4 shows a longitudinal section, enlarged with respect to FIG. 3, through this design.

In the designs according to FIG. 1 and FIGS. 3 and 4, it is predominantly material-specific properties which are responsible for the deformability of the transitional section 16. In the design according to FIG. 2, the transitional section 16 has a special shaping which is the main cause of the deformability, but in addition the material-specific properties are also significant.

According to the invention, the moulding 18 in all of the designs is produced in a multicomponent injection-moulding process from at least two different plastic materials. The transitional section 16 consists of a more elastic material, while the line-connecting element 4 and the connecting body 2 each consist of a less elastic, more dimensionally stable material. In principle, the connecting body 2 and the line-connecting element 4 can also consist of different materials.

In a preferred design, on the one hand, the transitional section 16 consists of a thermoplastic without fibre reinforcement and, on the other hand, the line-connecting element 4 and/or the connecting body 2 consist/consists of a thermoplastic with fibre reinforcement. For a homogeneous, monolithic connection of the sections it is advantageous if this is basically the same thermoplastic as the base material (in particular PA 12), in particular a portion of glass fibre (preferably approximately 23% glass fibre) being added for the connecting body 2 and/or the line-connecting element 4.

The transitional section 16 can also consist of an elastomer, and a suitable plastomer material, for example a duroplastic or thermoplastic, can be used for the connecting body 2 and/or the line-connecting element 4.

On account of the axial alignment of the connecting body 2 and line-connecting element 4 in the exemplary embodiments, the transitional section 16 is consequently also aligned coaxially thereto in between them. On account of the deformability of the transitional section 16, the line-connecting element 4 can be tilted in the transverse direction (double arrow 20) relative to the connecting body 2, but, if appropriate, can additionally also be moved in the axial direction by compression or lengthening of the transitional section 16 (double arrow 22 in FIGS. 1 and 2). The ability to tilt in the double-arrow direction 20 means that the angle between the axes 12 and 14 consequently changes.

In the design according to FIG. 1, the transitional section 16 widens essentially approximately in a hollow-conical manner towards the connecting body 2 from the line-connecting element 4. In the design according to FIG. 2, some areas of the transitional section 16 are of expansion- or concertinaed-bellows-like design, in particular are designed with a thinner, expanded or concertinaed wall 24 designed in the manner of a corrugated pipe. In the design according to FIGS. 3 and 4, the transitional section 16 is of continuously hollow-cylindrical design with, in particular over its length, an essentially constant wall thickness (constant inside and outside diameters). The precise dimensions, in particular the inside and outside diameters, should be fixed, particularly empirically, to match the material-specific properties of the particular material and also taking into consideration the dimensions (for example nominal width) of the (pipe) line fitted to the line-connecting element 4. In this case, the ratio of length L of the transitional section 16 to its outside diameter d (cf. FIG. 4) should be at least 2:1 in order to keep the media sealed in the case of buckling. In the preferred exemplary embodiment according to FIGS. 3 and 4, L:d is approximately in the region of 2.5:1 to 3.5:1, in particular at approximately 2.7:1 to 3:1.

The deformability, which is break-proof according to the invention, means that in practical use, in the event of shock loads, for example caused by an accident, breakages in the region of the line connector 1 and resultant leakages of fuel are avoided, with the advantageous result that the risk of fire within a vehicle is also substantially reduced.

The invention is not restricted to the exemplary embodiments illustrated and described, but also includes all designs acting in the same manner within the meaning of the invention as disclosed and claimed.

What is claimed is:

1. Line connector (1) for pipelines or hose lines carrying media, comprising:
  a connecting body (2) having at least one line-connecting element (4), wherein the or each line-connecting element (4) is connected to the connecting body (2) via a transitional section (16) which can be deformed elastically or plastically in such a manner that the transitional section can be bent or buckled transversely to a push-on axis (12) of the line and relative to the connecting body (2) while keeping the media sealed in, the line-connecting element (4) together with the transitional section (16), and the connecting body (2) being a monolithic single-piece molding (18) comprising at least two different plastic materials, characterized in that at least some regions of the transitional section (16) are of expansion- or concertinaed-bellows-like design.

2. Line connector according to claim 1, wherein the molding (18) in the region of the transitional section (16) consists of a relatively elastic material and in the region of the line-connecting element (4) or of the connecting body (2), consists of a material less elastic than the relatively elastic material.

3. Line connector according to claim 2, wherein the transitional section (16) consists essentially of an elastomer and the line-connecting element (4) or the connecting body (2) consists of a plastomer.

4. Line connector according to claim 1 characterized in that the line-connecting element (4) is designed as a pointed profile for the force- or form-fitting pushing-on of a line.

5. Line connector according to claim 1 characterized in that the connecting body (2) is designed as a coupling housing of a plug-in or socket part of a plug-in coupling.

6. Line connector according to claim 3, characterized in that the line-connecting element (4) is aligned coaxially with respect to the push-on axis (12) of the line, and the connecting body (2) is aligned coaxially with respect to a plug-in axis (14) of the plug-in coupling.

7. Line connector according to claim 1 characterized in that the line-connecting element (4) can additionally be moved in the axial direction relative to the connecting body (2).

8. Line connector according to claim 1 characterized in that the line-connecting element (4) has an abutment element in the form of a radial annular web (8), in a region of the line-connecting element lying opposite a free plug-in end (7).

* * * * *